(12) United States Patent
Howson

(10) Patent No.: US 6,540,608 B2
(45) Date of Patent: Apr. 1, 2003

(54) LOTTERY

(75) Inventor: Charles Howson, Hale (GB)

(73) Assignee: Shopalotto.com Limited, Stockport (GB)

( * ) Notice: Subject to any disclaimer, the term of this patent is extended or adjusted under 35 U.S.C. 154(b) by 0 days.

(21) Appl. No.: 09/909,371

(22) Filed: Jul. 19, 2001

(65) Prior Publication Data

US 2002/0082073 A1 Jun. 27, 2002

(30) Foreign Application Priority Data

Jul. 20, 2000 (GB) .............................. 0017772

(51) Int. Cl.⁷ .................................................. A63F 3/06
(52) U.S. Cl. .......................................... 463/17; 463/42
(58) Field of Search .............................. 463/17, 29, 42; 273/138.1; 705/14

(56) References Cited

U.S. PATENT DOCUMENTS 5,722,890 A * 3/1998 Libby et al. .................. 463/17
6,024,640 A * 2/2000 Walker et al. ................ 463/17
6,251,016 B1 * 6/2001 Tsuda et al. .................. 463/42
6,325,716 B1 * 12/2001 Walker et al. ................ 463/17

* cited by examiner

Primary Examiner—William C. Doerrler
Assistant Examiner—Melvin Jones
(74) Attorney, Agent, or Firm—Woodard, Emhardt, Naughton, Moriarty & McNett LLP

(57) ABSTRACT

A lottery played via the Internet, the lottery comprising a Web site arranged to present a player with a set of brands, and arranged to allow a player to select a subset of the set of brands, the Web site recording the selected subset of brands together with information identifying the player, a subset of brands subsequently being selected at random from the set of brands, the player being awarded a prize if the player's selected subset of brands corresponds to the randomly selected subset of brands.

25 Claims, 1 Drawing Sheet

LOTTERY

Figure 1:
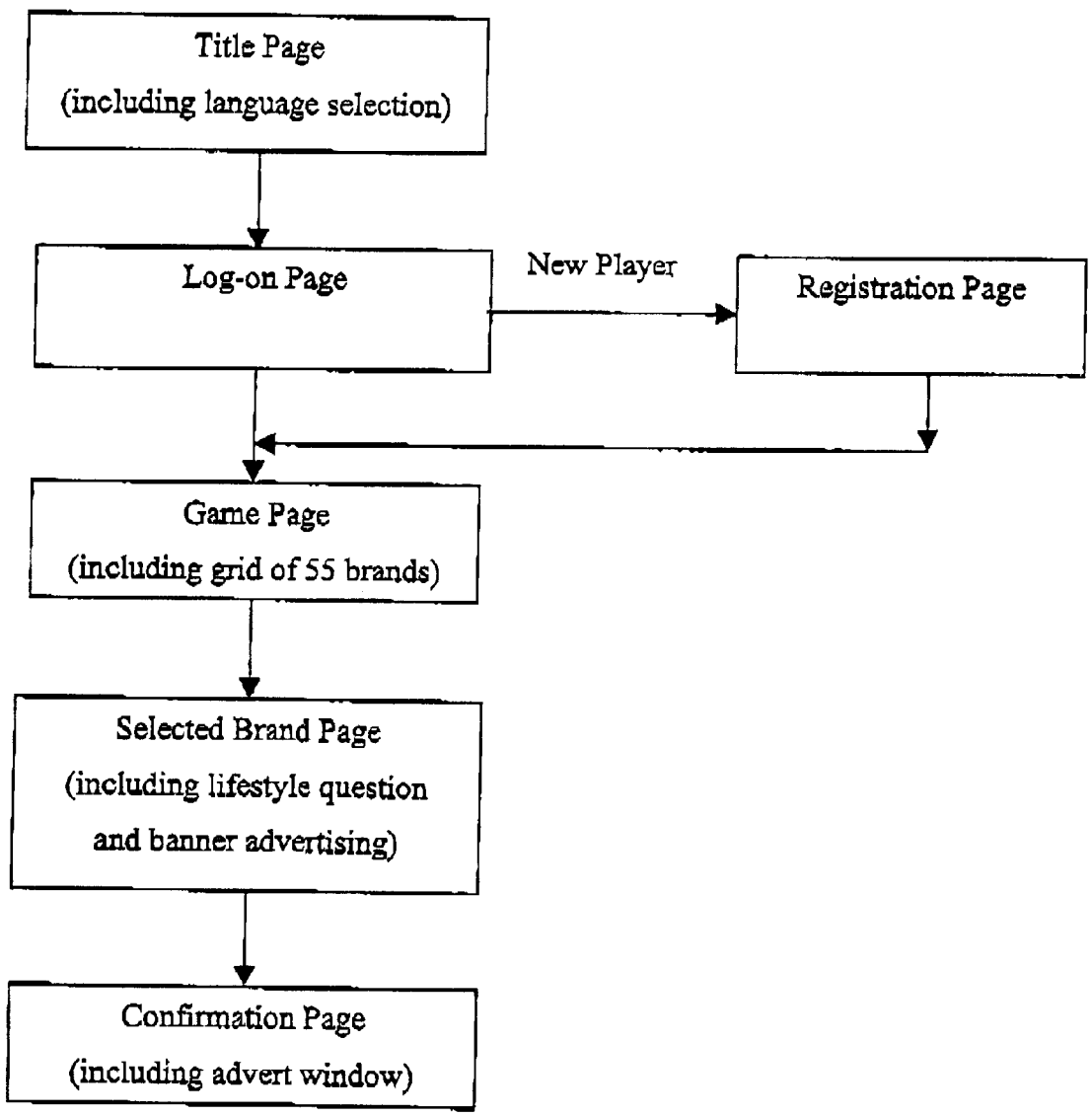

The present invention relates to a lottery, and in particular to a lottery which may be played via the Internet.

Many countries have a national lottery. Usually, the national lottery is run by a commercial company which has received a licence from a national government. Commonly a player of a national lottery is required to choose a small set of numbers from a larger set of numbers. For example, in the British National Lottery a player chooses six numbers from a possible 49 numbers. The lottery is "drawn" on a predetermined day by randomly selecting a small set of numbers from the large set of numbers. For example, in the British National Lottery six numbers are chosen from the 49 possible numbers using a machine which selects numbered balls at random.

Recently, lotteries have started to be provided on the Internet. A player of an Internet lottery logs onto a lottery Web site, and selects a set of numbers from a larger set of numbers in that same manner as a number format national lottery. Examples of Internet lotteries are Freelotto and Bananalotto. A player at the Freelotto Web site is required to select six numbers from a set of 54 numbers, and may then 'place' a bet by choosing one of three advertising banners. These advertising banners are referred to in the web site industry as 'click-throughs'. The choice of advertising banner is a positive choice of an advert by the lottery player, and it is believed that the player will choose an advert that he or she is interested in, or with which he or she identifies. Each time an advertising banner is selected by a player, the company to which that advert belongs will know that their advent was the subject of a positive choice by the player. This is different to conventional advertising in which a person is a passive viewer of an advert, and does not positively select that advert for viewing.

An Internet lottery site will generally charge a fee from an advertiser each time a player of the lottery selects a banner relating to that advert. This fee is a primary source of income for the Internet lottery site provides, and indeed there may be no cost for a player to enter the lottery itself.

A disadvantage of known number selection format lotteries that may be played via the Internet is that the choice of a small set of numbers from a large set of numbers does not of itself have any conventional significance.

It is an object of the present invention to provide a lottery which overcomes the above disadvantage.

According to the present invention there is provided a lottery played via the Internet, the lottery comprising a Web site arranged to present a player with a set of brands, and arranged to allow a player to select a subset of the set of brands, the Web site recording the selected subset of brands together with information identifying the player, a subset of brands subsequently being selected at random from the set of brands, the player being awarded a prize if the player's selected subset of brands corresponds to the randomly selected subset of brands.

The inventors have noted that the selection of a subset of numbers from a larger set of numbers is commercially "neutral" in the sense that numbers are selected without a player giving any consideration to commercial products, service etc. Players often select "lucky numbers", for example a player's birthday, wedding anniversary, house number, etc. By replacing each number with a brand (a different brand for each number), the selection of brands provides a powerful positive commercial choice. A player is likely to choose brands which relate to products of interest or products with which the player associated himself or herself.

The term 'brand' is not intended to be limited to a trademark. Instead, the term 'brand' is intended to include any promotional material, or any information that may be used as an advertisement.

Preferably, a fee is charged to a party responsible for a brand when that brand is selected by the player. The party responsible for the brand may be the brand owner, or could for example be an agency responsible for promoting the brand. As an alternative to charging a fee each time a brand is selected, a flat fee may be charged per month for a given brand.

Preferably, the Web site requires the player to answer a question. The question preferably relates to lifestyle choices of the player.

Preferably, the player is required to answer the question after the subset of brands has been selected, and prior to the Web site recording the subset of brands selected by the player.

Preferably, the answer to the question is recorded. This provides a general body of information which may be used for marketing purposes.

Preferably, the answer to the question is recorded together with information identifying the player and answers to previous questions, thereby providing information which is associated with the player. The information associated with the player may be used for marketing purposes.

Suitably, information associated with the player is recorded in a cookie located on a computer used by the player. The term 'cookie' is well known to people with expertise of the Internet, and refers to data placed on a hard drive of a user's computer by a Web server.

Preferably, information which will allow the Web site to determine automatically the preferred language of the player is recorded in the cookie.

Alternatively, information associated with a given player is recorded at a Web server of the Web site.

Preferably, a question to be answered by the player is selected from a range of possible questions on the basis of information associated with the player.

Preferably, the information associated with the player is used to deliver targeted advertising to the player.

Preferably, the targeted advertising comprises one or more banners, the player being required to select a banner in order to instruct the Web site to record the selected subset of brands.

Preferably, the Web site includes a confirmation page which confirms the subset of brands selected by the player, the confirmation page including targeted advertising.

Preferably, the Web site is configured to send a confirmation email to the player which confirms the selected subset of brands, the confirmation email including targeted advertising.

Preferably, the Web site is configured to send register emails to the player informing the player of recent winning subsets of brands, wherein the regular emails include targeted advertising.

Preferably, the targeted advertising includes one or more hypertext links to Webs sites of advertisers.

Preferably, information associated with the player is sold to a third party.

Preferably, the Web site displays an advert during time taken to record the brands selected by the player and the information identifying the player.

Preferably, the advert comprises a window displaying a Web site corresponding to a hypertext link located in the selected banner.

The invention also provides a method of providing a lottery comprising:

transmitting across a communication network to a user a signal representing a set of brands;

accepting a signal representing the user's selection of a subset of the set of brands;

recording the selected subset of brands together with information identifying the user;

accepting a signal representing a winning subset of brands;

comparing the winning subset of brands with the recorded selected subsets of brands; and generating an output when a match is found between the winning subset of brands and a recorded subset of brands, the output comprising information identifying the user that selected the subset of brands which matches the winning subset of brands.

The invention also provides a system for operating a lottery, comprising:

a server comprising
   a network interface to a communication network,
   a database access module, and
   a processor;
and a database;

wherein the processor receives information identifying a user and an associated subset of a set of brands, and stores this in the database, adding to information identifying other users and other associated subsets of brands previously stored in the database;

wherein the processor receives a winning subset of brands and accesses the database to compare the winning subset of brands with the subsets of brands stored in the database, generating an output when a match is found between the winning subset of brands and one or more of the stored subsets of brands, the output comprising information identifying the user that selected the subset of brands which matches the winning subset of brands.

The invention also provides a system for providing a lottery, comprising:

means for transmitting across a communication network to a user a signal representing a set of brands;

means for accepting a signal representing the user's selection of a subset of the set of brands;

means for storing the selected subset of brands together with information identifying the user;

means for accepting a signal representing a winning subset of brands;

means for comparing the winning subset of brands with the stored selected subsets of brands; and means for generating an output when a match is found between the winning subset of brands and one of the stored subsets of brands, the output comprising information identifying the user that selected the subset of brands which matches the winning subset of brands.

The invention also provides a method of entering a lottery comprising:

receiving across a communication network from a server a signal representing a set of brands;

accepting a user's input comprising a selected subset of the set of brands;

transmitting across the communication network to the server a signal representing the user's selected subset of the set of brands, for recordal at the server; and subsequently accepting a signal indicating a winning subset of brands and indicating whether or not the user's selected subset of brands corresponds to the winning subset of brands.

A specific embodiment of the invention will now be described by way of example only with reference to the accompanying drawing.

A lottery Web site comprises a series of interconnected pages, as shown in FIG. 1.

A title page of the Web site includes a banner identifying the site.

The title page includes a language selection portion which comprises flags of various countries. The selection of one of the flags by a player will determine the language in which the Web site is presented to the player. If a cookie has been placed on the player's computer (see below), information downloaded from the cookie may be used to automatically select the preferred language of the player.

The next page of the Web site that is presented to the player is a log-on page. A player that has previously played the lottery at the Web Site may enter a user name and password in order to proceed to the Internet lottery without having to fill out a registration form. Once the user name and password have been entered, the player selects a 'Play Now' button to proceed to a game page (the 'Play Now' button may include a logo).

A new player must select a 'New Player' box and will then be presented with a registration page. The registration page requests that the player provide his or her name and address, including the country in which the player is located. The registration page may request other information, for example that date of birth of the player and the sex of the player. The player may be required to tick a box indicating that he or she is above a certain age, and will also be presented with rules relating to the Internet lottery site. The player will enter a user name and password to be used during future visits to the Web site. Once the player has completed the registration page, he or she selects a 'Play Now' button. By selecting the 'Play Now' button the player acknowledges that the details set out on the registration page are correct, and that he or she agrees to be bound by the rules relating to the Internet lottery site. On selecting the 'Play Now' button, the user is presented with the game page. In an alternative configuration, the registration page may be followed by a confirmation page which provides a summary of the information entered by the player.

The game page comprises a grid having 55 boxes, each box containing a different brand. The brand may be a product name, a general brand, a company name, a picture of a product, etc. The brands are arranged in 5 rows, each bearing 11 product brands. The player is required to select 6 of the brands. When a brand is selected, the box containing the brand is modified to indicate that that brand has been selected, for example by providing a coloured border around that brand, or obscuring the brand with a logo. The selection of a brand may be accompanied by a sound.

Selection of the brands is a positive commercial choice. A player is likely to choose brands which relate to products of interest or products with which the player associates himself or herself. The brands selected by the player thus indicate commercial preferences of the player. A charge may be made to a brand owner each time their brand is selected by a player. Alternatively, a brand owner may be charged a flat rate per month to include their brand on the game page.

Once six brands have been chosen, the player is presented with a brand page indicating the six chosen brands together with a personalised message, for example reading:

"John—Thanks for playing today. You have chosen the following brands to enter the $1 million dollar free draw. Good luck!"

In addition to the six chosen brands, the brand page also includes three advertising banners. The advertising banners may relate to any of the six chosen brands, or may relate to other products or services. The advertising banners may be targeted on the basis of information known about the player (the manner in which this information is gathered is described below). For example, advertising banners relating to food products may be displayed if a player profile indicates that that player is particularly interested in food.

In order to place his or her bet, the player is required first to answer a simple question, for example "what type of car do you own?". The question is answered by selecting an answer from a scroll-down menu. Once the question has been answered the player then selects one of the three banner advertisements in order to 'place' his or her bet (i.e. to have his or her bet recorded at the Web server). The selection of a banner advertisement is known as a 'click-through'.

The brands that were selected by the player are recorded at the Web server, together with registration details identifying that player. Each brand has a number associated with it, although this number will not be visible to the player of the lottery. The selection of a given brand is recorded at the Web server as the selection of a corresponding number. Thus, although from the player's point of view brands have been selected, from a computational point of view the selection is of 6 numbers from 55. The selected brands may also be recorded directly as brands, to allow selection rates for brands and groups of brands to be calculated.

Whilst the registration details and chosen brands are being recorded, the brand page changes to a confirmation page. The confirmation page comprises an area which confirms that the player's bet is being placed (i.e. his selected brands and his identity details are being recorded), and a window displaying an advertiser's web site. The web site corresponds to the banner advertisement that was selected by the player. The web site is imported into the window by a hypertext link that is contained in the banner advertisement, which is activated by the 'click through'.

Once the player's registration details and chosen brands have been recorded, a serial number for the player's bet is displayed on the confirmation page. The information may be stored upon a suitable storage medium.

The player may navigate the advertiser's web site in the usual way, although the advertiser's web site remains inside the window and the player is thus still effectively in the lottery web site.

A confirmation e-mail is sent to the player of the lottery, the e-mail indicating the brands chosen by the player, when the lottery draw will take place, and including a serial number for the player's bet. The e-mail may also carry advertising corresponding to the brands or the banner advert selected by player. The e-mail may carry advertising selected on the basis of information known about players (gathering of this information is described below).

Although registration of the player is described as taking place before the player is presented with the game page, for marketing reasons registration may take place later. Specifically, the player may be presented with the game page and be allowed to choose his or her six brands prior to registration. This is advantageous because it allows the player to see the game page prior to deciding whether or not he or she wishes to register.

The 'draw' of the lottery may comprise the selection by a computer of 6 numbers at random from a possible 55 numbers. Alternatively, a neutral third party may take 6 numbered balls from a possible 55 at random, for example by pulling them from an opaque bag. As a further alternative, a ball-draw machine may be used to select numbered balls.

It will be appreciated that the lottery need not necessarily utilise the selection of a set of numbers, but may instead use the random selection of a set of brands. For example, 55 balls all bearing different brands may be held in an opaque bag, 6 balls being taken from the bag at random. Where this is done, the brands selected by players may be recorded at the Web server as code representative of the brands, not necessarily as numbers.

The lottery may include prizes for players that correctly choose 5 or less brands.

A cookie is saved onto a player's computer when a player registers at the Internet lottery site. The cookie includes the player's name and address. When the player answers a question at the Web Site, for example "what type of car do you own?", the answer to the question is recorded at the cookie. A new question is asked each time the player plays the lottery, allowing a detailed profile of the player to be built up and recorded in the cookie. The questions asked may be determined by answers given to previous questions. For example, if a player has indicated that they cannot drive, they will not be asked further questions about what car they own, but may instead be asked questions about what public transport they use.

The cookie may include a player's preferred choice of language. When this is done, the preferred language is automatically determined from the player's computer when the player visits the lottery Web site, allowing the player to go directly to the log-in page.

When a player selects his or her six brands in order to place a bet at the lottery site, the owners of those brands may be provided with the profile of that player that has been stored in the cookie on their computer. This allows the brand owners to build up a picture of the type of people that select their brand or brands.

Certain adverts and banners may be presented to a player at the Internet lottery site on the basis of the information recorded about that player in their cookie. For example, if the player has indicated that they own a sports car, or that they are interested in buying a sports car, a banner or advert relating to a brand of sports car maybe displayed to that player on a page of the Internet lottery (for example, on the brand page). This allows an advertiser to have a highly targeted advertising campaign based upon player profiles.

As an alternative to the use of a cookie, information regarding a player may be stored at a computer supporting the Web site. The information will be identified using the player's name and password. The stored information may be used to determine which adverts to display to the player or what questions to ask the player, in the same way as information downloaded from a cookie.

The grid of brands to be chosen may be general, for example using globally known brands, or may be specific to certain market or subject areas. For example, a music lottery site may have a grid showing musical artists, singles and albums; a travel Internet lottery site may present hotels, airlines, resorts; a sports Internet lottery site may present sports clubs, players, games, venues; a women's Internet lottery may present beauty products, magazines, clothes; a men's Internet lottery may present cars, magazines, alcoholic drinks; a 'silver surfers' Internet lottery (i.e. one targeted at people over 55) may present books, holiday destinations, cruises, etc. Other possible sets of brands may be book titles or film titles etc.

There is no limit to the information that may be presented as brands, and the term 'brand' is not intended to limit the information presented in the game screen boxes to just trademarks. Instead, the term 'brand' is intended to include any promotional material, or information that may be used as an advertisement. For example, a national tourist organisation may wish to advertise their country by placing the name of the country, or a suitable picture in a box.

The Internet lottery site may be configured to send an e-mail every day to all players registered at the site. The e-mail will confirm lottery results from the previous day, details of the winner and advertisements from sponsors of the Web Site. The sponsors' advertisements may be targeted in accordance with the information known about players.

Although the above embodiment of the invention includes a grid having 55 brands, the grid may have any number of brands. The number of brands will determine directly the probability of a player winning the lottery. For example, the probability of a player correctly selecting 6 brands from 49 will be approximately 14 million to 1.

The lottery may be free to players.

Because the lottery comprises a Web site, it may be accessed using any machine having Internet capability, for example a computer, Broadband television, Digital television, Wireless Application Protocol (WAP) telephone, etc. A shortcut to the lottery may be located on a 'desktop' of a player's computer, to provide convenient access to the Web site.

What is claimed is:

1. A lottery played via the Internet, the lottery comprising a Web site arranged to present a player with a set of brands, and arranged to allow a player to select a subset of the set of brands, the Web site recording the selected subset of brands together with information identifying the player, a subset of brands subsequently being selected at random from the set of brands, the player being awarded a prize if the player's selected subset of brands corresponds to the randomly selected subset of brands.

2. A lottery according to claim 1, wherein a fee is charged to a party responsible for a brand when that brand is selected by the player.

3. A lottery according to claim 1, wherein the Web site requires the player to answer a question.

4. A lottery according to claim 3, wherein the player is required to answer the question after the subset of brands has been selected, and prior to the Web site recording the subset of brands selected by the player.

5. A lottery according to claim 3, wherein the answer to the question is recorded.

6. A lottery according to claim 5, wherein the answer is recorded together with information identifying the player, and answers to previous questions, thereby providing information which is associated with the player.

7. A lottery according to claim 6, wherein information associated with the player is recorded in a cookie located on a computer used by the player.

8. A lottery according to claim 7, wherein information which will allow the Web site to determine automatically the preferred language of the player is recorded in the cookie.

9. A lottery according to claim 6, wherein information associated with the player is recorded at a Web server of the Web site.

10. A lottery according to claim 6, wherein a question to be answered by the player is selected from a range of possible questions on the basis of information associated with the player.

11. A lottery according to claim 6, wherein the information associated with the player is used to deliver targeted advertising to the player.

12. A lottery according to claim 11, wherein the targeted advertising comprises one or more banners, the player being required to select a banner in order to instruct the Web site to record the selected subset of brands.

13. A lottery according claim 11, wherein the Web site includes a confirmation page which confirms the subset of brands selected by the player, the confirmation page including targeted advertising.

14. A lottery according to claim 11, wherein the Web site is configured to send to the player a confirmation email which confirms the selected subset of brands, the confirmation email including targeted advertising.

15. A lottery according to claim 11, wherein the Web site is configured to send regular emails to the player informing the player of recent winning subsets of brands, wherein the regular emails include targeted advertising.

16. A lottery according to claim 13, wherein the targeted advertising includes one or more hypertext links to Webs sites of advertisers.

17. A lottery according to claim 6, wherein information associated with the player is sold to a third party.

18. A lottery according to claim 1, wherein the Web site displays an advert during time taken to record the brands selected by the player and the information identifying the player.

19. A lottery according to claim 12, wherein the advert displayed comprises a window displaying a Web site corresponding to a hypertext link located in the selected banner.

20. A method of providing a lottery comprising:

transmitting across a communication network to a user signal representing a set of brands;

accepting a signal representing the user's selection of a subset of the set of brands;

recording the selected subset of brands together with information identifying the user;

accepting a signal representing a winning subset of brands;

comparing the winning subset of brands with the recorded selected subsets of brands; and generating an output when a match is found between the winning subset of brands and a recorded subset of brands, the output comprising information identifying the user that selected the subset of brands which matches the winning subset of brands.

21. A program storage device readable by a machine and encoding a program of instructions for executing the method steps of claim 20.

22. A system for operating a lottery, comprising:

a server comprising
 a network interface to a communication network,
 a database access module, and
 a processor;
and a database;

wherein the processor receives information identifying a user and an associated subset of a set of brands, and stores this in the database, adding to information identifying other users and other associated subsets of brands previously stored in the database;

wherein the processor receives a winning subset of brands and accesses the database to compare the winning subset of brands with the subsets of brands stored in the database, generating an output when a match is found between the winning subset of brands and one or more of the stored subsets of brands, the output comprising information identifying the user that selected the subset of brands which matches the winning subset of brands.

23. A system for providing a lottery, comprising:

means for transmitting across a communication network to a user a signal representing a set of brands;

means for accepting a signal representing the user's selection of a subset of the set of brands;

means for storing the selected subset of brands together with information identifying the user;

means for accepting a signal representing a winning subset of brands;

means for comparing the winning subset of brands with the stored selected subsets of brands; and means for preparing an output when a match is found between the winning subset of brands and one of the stored subsets of brands, the output comprising information identifying the user that selected the subset of brands which matches the winning subset of brands.

24. A method of entering a lottery comprising:

receiving across a communication network from a server a signal representing a set of brands;

accepting a user's input comprising a selected subset of the set of brands;

transmitting across the communication network to the server a signal representing the user's selected subset of the set of brands, for recordal at the server; and subsequently accepting a signal indicating a winning subset of brands and indicating whether or not the user's selected subset of brands corresponds to the winning subset of brands.

25. A program storage device readable by a machine and encoding a program of instructions for executing the method steps of claim 24.

* * * * *